United States Patent [19]

Fica et al.

[11] 4,319,958
[45] Mar. 16, 1982

[54] CIRCUIT ARRANGEMENT FOR CONTACTLESS TRANSMISSION OF TEMPERATURE INFORMATION FROM A FUEL ASSEMBLY OF A NUCLEAR REACTOR

[75] Inventors: Ladislav Fica; Milos Cerny, both of Pilsen, Czechoslovakia

[73] Assignee: Skoda, oborovky podnik, Pilsen, Czechoslovakia

[21] Appl. No.: 47,807

[22] Filed: Jun. 12, 1979

[30] Foreign Application Priority Data

Jun. 14, 1978 [CS] Czechoslovakia ............. 3899-78

[51] Int. Cl.³ ............................................. G21C 17/00
[52] U.S. Cl. ............................................. 376/247
[58] Field of Search ............. 176/19 R; 324/104, 105

[56] References Cited

U.S. PATENT DOCUMENTS 3,087,886 4/1963 Robinson ............. 176/19 R
3,296,081 1/1967 Wildgoose ............. 176/19 R Primary Examiner—S. A. Cangialosi

[57] ABSTRACT

Contactless transmission of information about temperatures within a fuel assembly of a nuclear reactor by means of a thermoelement situated in the fuel assembly, the thermoelement generating a magnetic field the intensity of which is proportional to the temperature within the fuel assembly. A harmonic magnetic sensing element disposed outside the fuel assembly for registering the value of intensity of this magnetic field is employed, the sensing element being connected to an arrangement for the evaluation of such. The fuel assembly is provided with a sheath or housing which permits the passage of the magnetic field therethrough.

3 Claims, 2 Drawing Figures

CIRCUIT ARRANGEMENT FOR CONTACTLESS TRANSMISSION OF TEMPERATURE INFORMATION FROM A FUEL ASSEMBLY OF A NUCLEAR REACTOR

BACKGROUND OF THE INVENTION

The invention relates to a circuit arrangement for the contactless transmission of information about the temperature within a fuel assembly of a nuclear reactor, and particularly for the prevention of local breakdowns in the active zone thereof.

One of the most important problems of a safe operation of quick reactors is the detection of the start of so-called local breakdowns of a fuel assembly and their early liquidation (melt down). Local breakdowns of fuel assemblies are conditions wherein the permeability of the fuel assembly is gradually reduced, and thus the passage of liquid sodium is reduced and its outlet temperature increased. This condition can have different causes, such as the increase of the volume of the fuel in the course of burning, the clogging of the cross section of passages by dirt from the cooling medium, or the presence of foreign objects. In its consequences this process causes an overheating and later the melting of the fuel assembly. Due to heat exchange with the surrounding space there is a possibility of an avalanche extension of the breakdown to a certain zone, and in the limit case to the whole active zone. An immediate consequence is a long time shut-down of a nuclear power plant from operation and the threatening of the safety of people by released heat and intensive radiation.

It would be best possible to indicate the start of a local breakdown of a fuel assembly by measuring the rate of passage of the cooling medium in each fuel assembly. This method, however, meets substantial technical difficulties. The indication of the start of boiling of sodium by some acoustic method is explicit, but the following reaction of the breakdown system cannot prevent the destruction of the fuel assembly where the breakdown occurred. For these reasons, the best way for measuring temperatures seems to be the measuring of the temperatures at the output of each fuel assembly. A common introduction of this method is, however, prevented by the circumstance that the system for measuring temperatures must not be an obstacle for the charging and the exchange of fuel.

Actually known arrangements for the contactless transmission of information about temperatures from fuel assemblies of nuclear reactors employ an electromechanical transducer situated in the fuel assembly, which transducer transforms direct current of the thermoelement to pulsating current. A transformer winding within the fuel assembly is fed by this pulsating current, whereby the voltage produced by the thermoelement is transformed to a receiving winding outside the fuel assembly.

A drawback of this solution is the limited reliability of the mechanically movable parts of the electromechanical transducer under high temperatures, an unstable operation with variations of surrounding temperatures, variation of the resistance of contacts due to condensation of components released from insulating materials under high temperatures and variations of the parameters of springs which are used in the arrangement. The above-mentioned influences, including the influence of intensive radiation on aging and on the mechanical properties of materials, make the solution with an electromechanical transducer entirely out of question for a common application in nuclear energetics.

SUMMARY OF THE INVENTION

It is an object of this invention to eliminate these drawbacks and to provide a circuit arrangement capable of indicating local breakdowns of fuel assemblies even as they start. According to this invention, a thermoelement situated inside the fuel assembly is connected with a winding of a coil coupled by magnetic coupling through the wall of the fuel assembly with a harmonic magnetic sensing element, whereby a circuit for working higher harmonic frequencies with an arrangement for evaluation, and a source of a current variable with time are connected to said harmonic magnetic sensing element.

An advantage of this arrangement is the determination of a local breakdown immediately when it originates, thus enabling an instantaneous action of the breakdown system of the reactor. Thus a prolonged shut-down of a nuclear power plant and consequently also substantial financial losses can be prevented. As the problem of detection of local breakdowns is one of the main problems which up to now has prevented a speedier introduction of highly efficient quick reactors, the solution according to this invention can substantially speed up the adoption of quick reactors. Another important advantage is the knowledge of the temperature of the cooling medium at the outlet from each individual fuel assembly, which enables the thermal optimalization of the output of the reactor and to achieve an overall increase of generated electric energy. A further advantage of the solution is the continuous transmission of information about temperature, a quick reaction to a change of the measured temperature depending on the time constant of the thermoelement, the possibility of reproduction of measurements, and mainly the elimination of all mechanically movable elements, thus increasing substantially the reliability of the system.

DESCRIPTION OF THE DRAWINGS

An examplary practical embodiment of a circuit arrangement according to this invention is illustrated in the attached drawings, wherein.

DESCRIPTION OF THE PREFERRED EMBODIMENT

Figure 1:
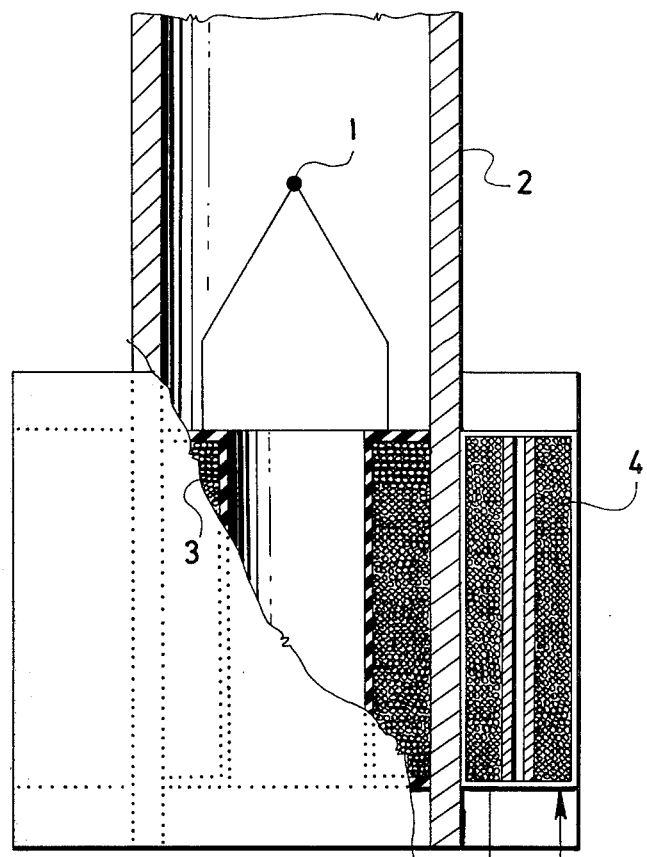
FIG. 1 is a diagrammatic, partially sectional view of a part of a fuel assembly and of the temperature measuring arrangement.
Figure 1:
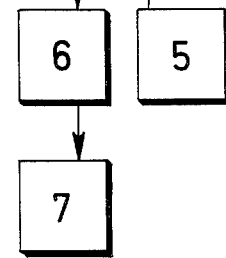
Figure 2:
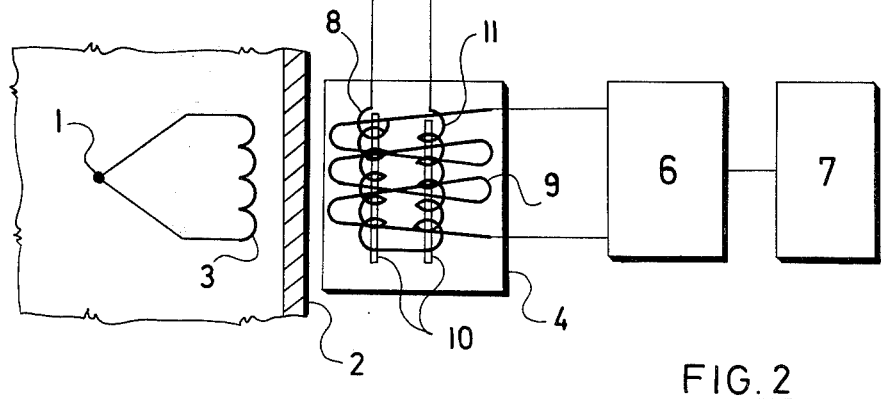
FIG. 2 is a circuit diagram of the arrangement of FIG. 1.

As shown in the drawings, a thermoelement 1 is disposed within a nuclear fuel assembly 2 and is connected to the winding of a coil 3 located within the assembly. Outside the fuel assembly 2 a harmonic magnetic sensing element 4 is provided, element 4 being connected to a source 5 of a current which is variable with time and to a circuit 6 for working with higher harmonic frequencies, an arrangement 7 for evaluation being connected to circuit 6. The arrangement operates as follows.

The thermoelement 1 feeds the coil 3, creating a magnetic field around the coil 3, such field passing through the wall of the fuel assembly. The intensity of the magnetic field depends on the difference of temperatures between the measuring end and the comparison end of the thermoelement 1, which is disposed in the direction of the longitudinal axis of the fuel assembly 2, that is, it depends on the temperature inside the fuel assembly 2. The lines of force of the magnetic field of the coil 3 extend into the harmonic magnetic sensing element 4, which is connected to the source 5 of a current variable with time, feeding an excitation winding 8 and a counter-current excitation winding 11 wound in mutually opposite directions on bands 10 of magnetically soft material. It is advantageous if the source 5 of current variable with time supplies an alternating current of undistorted sine wave shape of such an intensity that the strength of the magnetic field in the bands 10 is below the zone of magnetic saturation of the material of which the bands 10 are made.

As the excitation winding 8 and the counter-current excitation winding 11 are connected in mutually opposite directions, their magnetic fluxes are mutually subtracted and only a small voltage is induced into the signal winding 9 wound over the excitation winding 8 and the countercurrent excitation winding 11. If the lines of force of the magnetic field of the coil 3 start to engage the bands 10, the working point on the magnetization curve of the bands 10 is shifted, the symmetry of magnetization of the bands 10 for individual half periods of the sine current supplied from the source 5 of current variable with time is disturbed, and higher, predominantly even numbered harmonic frequencies of the source 5 of current variable with time are generated in the signal winding 9. The fundamental first harmonic frequency is separated by the circuit 6 for working higher harmonic frequencies, advantageously again the second harmonic frequency is measured or registered by the evaluation arrangment 7. The arrangement 7 for evaluation is, for instance, a measuring apparatus, or a recorder can be directly calibrated in temperature units since the amplitude of higher harmonic frequencies is proportional to the intensity of the magnetic field in the coil 3, which is proportional to the temperature measured by the thermoelement 1.

The principle and operation of the described arrangement remains the same if the harmonic magnetic sensing element 4 is utilized as an indicator of zero intensity of the magnetic field during compensation measurements, and also if the design is arranged so that the harmonic magnetic sensing element 4 engages into the interior of the fuel assembly 2.

Due to the presence of the cooling medium, for instance, liquid sodium, it is possible to enclose individual operating parts inside and outside the fuel assembly in vacuum-tight enclosures of stainless steel, which has a low magnetic permeability and thus permits the passage of the magnetic field of coil 3 therethrough, and to provide cable outlets with metal mantles and high temperature (mineral) insulation. In the case of an exchange of a fuel assembly, the parts ouside the fuel assembly can remain in position.

The enclosure of the fuel assembly, at least in the part thereof between coils 3 and 4, can also be made of other materials having suitable strength, low magnetic permeability, and resistance to high temperatures. Thus the enclosure or the part of it between coils 3 and 4 may be made of a suitable high strength refractory ceramic material.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. A circuit arrangement for contactless transmission of information about temperatures from a fuel assembly of a nuclear reactor, comprising a thermoelement situated inside said fuel assembly, and circuit means for processing the second and higher order harmonic frequencies magnetically and connecting said thermoelement with the winding of a coil located inside the fuel assembly, the magnetic field intensity of said coil generated by such a thermocouple being controlled by the fuel assembly temperature, a harmonic magnetic sensing element responsive to N times the fundamental frequency where N is an integer greater than two, said sensing element measuring the magnetic field intensity of the coil which is coupled with said harmonic magnetic sensing element.

2. A circuit arrangement as claimed in claim 1, wherein the harmonic magnetic sensing element is connected to a circuit for processing even-numbered frequencies, the amplitude of said even-numbered harmonic frequencies being proportional to the temperature within the fuel assembly, said circuit being connected to an evaluation circuit for evaluating the amplitude of the even-numbered harmonic frequencies, which connection enables the temperatures to be measured.

3. A circuit arrangement as claimed in claim 1, wherein a time-variable current source is connected to the harmonic magnetic sensing element.

* * * * *